United States Patent [19]
Rice et al.

[11] Patent Number: 5,711,198
[45] Date of Patent: Jan. 27, 1998

[54] VERTICAL LATHE WORKPIECE SUPPORT STRUCTURE

[75] Inventors: Rhonda M. Rice, Bristol, Tenn.;
Charles S. Harless, Bristol, Va.;
Sharon A. Brent, Bristol, Tenn.;
Deborah C. Sproles, Abingdon, Va.;
Richard G. Cunningham, Blountville, Tenn.

[73] Assignee: Dana Corporation, Toledo, Ohio

[21] Appl. No.: 641,313

[22] Filed: Apr. 30, 1996

[51] Int. Cl.$^6$ .................................................. B23B 25/00
[52] U.S. Cl. ........................... 82/122; 82/162; 82/170; 269/45; 269/306
[58] Field of Search ........................... 82/122, 162, 163, 82/153, 170; 269/45, 306, 315; 142/48, 50

[56] References Cited

U.S. PATENT DOCUMENTS

| | | |
|---|---|---|
| 258,910 | 6/1882 | Fuller . |
| 439,531 | 10/1890 | Leck . |
| 470,229 | 3/1892 | White .................................. 82/162 |
| 526,790 | 10/1894 | Roberts . |
| 685,692 | 10/1901 | Rhodes . |
| 921,521 | 5/1909 | Dodge et al. . |
| 1,350,840 | 8/1920 | Robbins .............................. 82/122 |
| 2,062,727 | 12/1936 | Rich . |
| 2,923,193 | 2/1960 | Schaid et al. . |
| 3,691,878 | 9/1972 | Mitchell ............................. 82/162 |
| 4,253,649 | 3/1981 | Hewson .............................. 269/45 |
| 4,779,856 | 10/1988 | Beeler ................................ 269/45 |

*Primary Examiner*—Steven C. Bishop
*Attorney, Agent, or Firm*—MacMillan, Sobanski & Todd

[57] ABSTRACT

A support structure for laterally supporting a workpiece in a vertical lathe so as to hold the axis of the workpiece aligned with the vertical support axis of the lathe. The support structure includes a rod which is vertically supported on the lathe. The rod supports a movable locator rest assembly. The locator rest assembly includes a horizontally extending rod which terminates in a part rest which can be positioned so as to engage and support the workpiece in a precisely vertical manner.

11 Claims, 4 Drawing Sheets

5,711,198

VERTICAL LATHE WORKPIECE SUPPORT STRUCTURE

BACKGROUND OF THE INVENTION

This invention relates in general to workpiece supporting structures for lathes and in particular to an improved structure for precisely supporting a workpiece for machining in a vertically oriented lathe. The lathe is one of the most basic of all of the metal and wood working tools. A typical lathe includes a pair of centers or a chuck which engage the end of a workpiece and rotate the workpiece about an axis. As the workpiece is rotated, a non-rotating cutting tool is moved into engagement with the outer surface of the workpiece to remove material therefrom. As a result, material is removed from the outer surface of the workpiece to form a desired shape or profile thereof. Cylindrical and conical parts, such as shafts, pins, bolts, discs, and the like are often machined on lathes. For example, a forged shaft having a relatively rough outer surface may be finish machined in a lathe to provide a relatively smooth outer surface thereabout.

In most lathes, the workpiece is supported between a fixed center and an axially movable center. To install the workpiece in the lathe for machining, the movable center is initially moved to a retracted position, wherein it is disposed relatively far away from the fixed center. The workpiece is manually inserted between the two centers such that one end of the workpiece contacts the fixed center. Then, the movable center is operated to move axially toward the fixed center until it contacts the opposite end of the workpiece. At this point, the workpiece should be precisely aligned with the axis of rotation defined by the two centers.

In horizontally oriented lathes in which the workpiece is supported on two centers, the workpiece is supported for rotation about a horizontal axis of support extending between a fixed tailstock and a horizontally movable headstock. Since gravity acts perpendicularly to this horizontal axis of support, workpiece supports may be needed to further support the work piece between the headstock and the tailstock to prevent bowing due to the effects of gravity. One such support which is known from the prior art includes a vertically extending standard and a horizontally extending member. The member carries a plate which includes upper and lower surfaces which are concavely curved relative to the horizontal axis. The concavely curved surfaces are used to support the workpiece during use. While the workpiece is being rotated by the headstock, the cutting tool is selectively moved into engagement with the outer surface of the workpiece to remove material therefrom at selected locations between the headstock and tailstock.

In a vertical lathe, the workpiece is typically rotatably supported on a lower tailstock so as to extend upwardly therefrom. An upper headstock is then moved downwardly to engage the upper end of the workpiece, thereby fixing the workpiece for rotation by the headstock about a vertical axis of support extending between the upper headstock and the lower tailstock. Gravity acts along the axis of support such that the weight of the workpiece is supported on the lower tailstock.

Certain elongated workpieces define a longitudinal axis about which the workpiece must be rotated during machining on a lathe. For example, it is known to forge stubshafts for vehicle drivetrains such as those in passenger cars and light trucks. If such a stubshaft is machined along an axis which is offset from or at an angle to the longitudinal workpiece axis, the workpiece is unusable. To help prevent such misalignment, it is known to form the workpiece with conically recessed centers at the longitudinal ends thereof. Conically convex contact portions of the headstock and tailstock extend into the workpiece centers to align the workpiece longitudinal axis with the vertical axis of the lathe.

Automated vertical lathes may be provided with a monitoring device which senses the movement of the headstock when engaging the workpiece. If the motion of the headstock is obstructed before moving an expected distance, this is an indication the workpiece has moved to one side, and the contact portion of the headstock had contacted the upper end of the workpiece outside of the upper center. In such a lathe, the headstock is moved with a force which cannot drive the conical contact surface of the headstock fully into the material of the workpiece. The lathe can then be stopped, the headstock retracted, and the workpiece realigned on the tailstock. Although the workpiece is not destroyed, production is slowed and costs increased by such misalignments.

Additionally, certain conditions may occur in which a misalignment is not detected by headstock movement monitoring. For example, a workpiece may only be slightly misaligned in the lathe, such that the contact portion of the headstock can be driven into the conical upper center of the workpiece, and engage the angled side of the upper center. The sides of the conical contact surface of the headstock and the conical upper center may cooperate to move the workpiece into proper vertical alignment in the lathe. Occasionally, however, the pointed tip of the contact portion of the headstock is driven into the side of the center, forcing metal into the center and making the center more of an oval shape. In such a situation, only a small diameter tip portion of the conical contact surface of the headstock is driven into the material of the workpiece, which generates insufficient resistance to halt the movement of the headstock. Thus the headstock motion monitor cannot detect this type of misalignment.

Additionally, the contact portion of the headstock may become worn with use, so that the profile of the contact portion is reduced, with smaller diameters at various heights within the conical contact portion. Such a worn contact portion may be fully inserted into the relatively larger recess of the upper center of the workpiece at a position offset from the workpiece axis. Since the contact portion is fully inserted, the headstock motion monitor will not detect this type of misalignment.

SUMMARY OF THE INVENTION

This invention relates to a support structure for laterally supporting a workpiece in a vertical lathe so as to hold the axis of the workpiece aligned with the vertical support axis of the lathe. The support structure includes a rod which is vertically supported on the lathe. The rod supports a movable locator rest assembly. The locator rest assembly includes a horizontally extending rod which terminates in a part rest which can be positioned so as to engage and support the workpiece in a precisely vertical manner.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
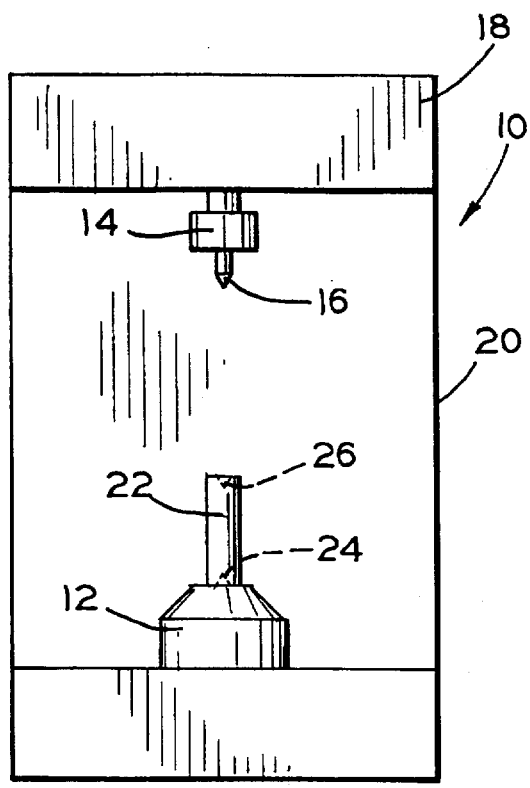
FIG. 1 is a schematic view of a workpiece supported on a tailstock of a prior art vertical lathe with a headstock of the lathe in a retracted position.

In the following description of the invention, certain terminology will be used for the purpose of reference only, and are not intended to be limiting. Terms such as "rightward", "leftward", "clockwise", and "counterclockwise" refer to directions in the drawings to which reference is made. Such terminology will include the words specifically mentioned above, derivatives thereof, and words of similar import.

Referring now to the drawings, there is illustrated in FIG. 1 a prior art vertical lathe indicated generally at 10. The lathe 10 includes a lower tailstock 12. The tailstock 12 is rotatable about a vertical axis of support (indicated at V in FIG. 2) of the lathe 10. The tailstock 12 includes a conical contact portion (not shown) on the upper surface thereof which is centered on the lathe axis V. The lathe 10 also includes an upper headstock 14 above the lower tailstock 12. The headstock 14 is selectively driven by a motor (not shown) to rotate about the lathe axis V. The headstock 14 is selectively movable axially along the lathe axis V. The headstock includes a conical contact portion 16 on the lower surface thereof which is centered on the lathe axis V. The lathe 10 further includes a frame 18 for supporting the headstock 14 and the tailstock 12 relative to one another. An enclosure 20 is typically provided to protect operators and other persons (not shown) from accidentally contacting moving parts of the lathe 10 during automated operation thereof, for example, when the lathe 10 is under CNC control. Finally, the lathe 10 includes a movable cutting tool (not shown) for selectively machining workpieces mounted in the lathe 10.

An elongated workpiece 22 may be placed on the tailstock 12 so as to extend vertically therefrom. The workpiece 22 is preferably provided with conically recessed centers 24 and 26 at the lower and upper longitudinal ends thereof, respectively, which mate with the respective conical contact portion of the tailstock 12 and the conical contact portion 16 of the headstock 14.

In operation, the operator places the workpiece 22 on the tailstock 12 so that the conical contact potion of the tailstock 12 is fitted into the lower center 24 of the workpiece 22. The operator then closes the enclosure 20, and actuates the lathe 10 to move the headstock 14 downwardly to drive the contact portion 16 thereof into the upper center 26 of the workpiece 22.

Figure 2:
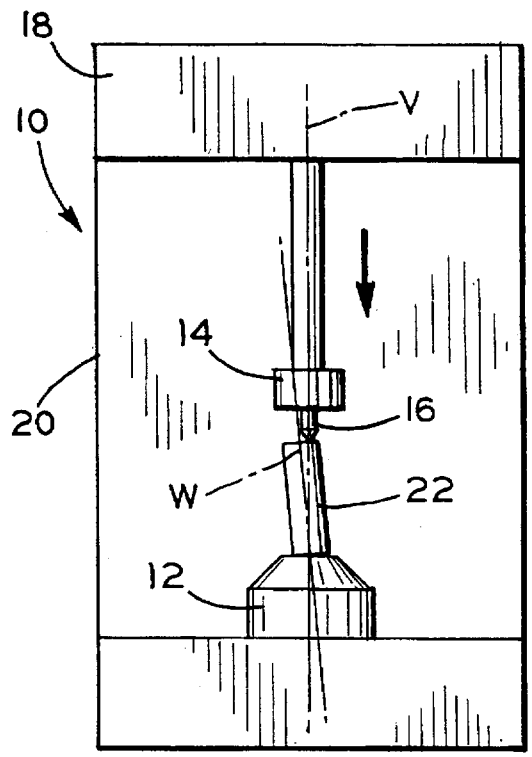
FIG. 2 is a view similar to FIG. 1, showing the workpiece tilted to one side, with the headstock engaging the upper end of the workpiece at a position spaced apart from the workpiece centerline.

As shown in FIG. 2, the workpiece 22 may become cocked on the tailstock 22 so that the centerline axis of the workpiece 22, indicated at W, is not aligned with the lathe axis V. The workpiece 22 may be tilted in this cocked position if the operator does not load the workpiece 22 properly onto the tailstock 12. Such tilting may also occur if the workpiece 22 is jarred by a vibration between the time the operator loads the workpiece onto the tailstock 22, and the time that the headstock 14 engages the upper end of the workpiece 22.

If the workpiece 22 is grossly out of alignment with the lathe 10, with the workpiece axis W at an angle to the lathe axis V such that the contact portion 16 does not enter the upper center 26 of the workpiece 22, a headstock vertical motion sensor (not shown) may generate a signal alerting the operator to the problem, and halting automated machining of the workpiece 22. However, if the workpiece 22 is only slightly misaligned with the lathe 10, the contact portion 16 of the headstock 14 may not contact the upper surface of the workpiece 22, but rather contact a side of the upper center 26 on the workpiece 22. In such a case, the contact portion 16 may deform the side of the upper center 26 to hold the workpiece 22 in the cocked position illustrated in FIG. 2. Alternately, the contact portion 16 of the headstock 14 may be worn so that the contact portion 16 is only a loose fit in the upper center 26 of the workpiece 22. In such a situation, the contact portion 16 may fit into the upper center 26 with the workpiece 22 still cocked at an angle to the lathe 10. If the lathe 10 were to machine the workpiece 22 with the workpiece 22 cocked, the machined outer surfaces of the workpiece 22 would not be at the desired radius from the workpiece axis W, since the cutting tool of the lathe 10 moves at predetermined distances from the lathe axis V of the lathe 10, and does not compensate for misalignment of the workpiece axis W with the lathe axis V.

Figure 3:
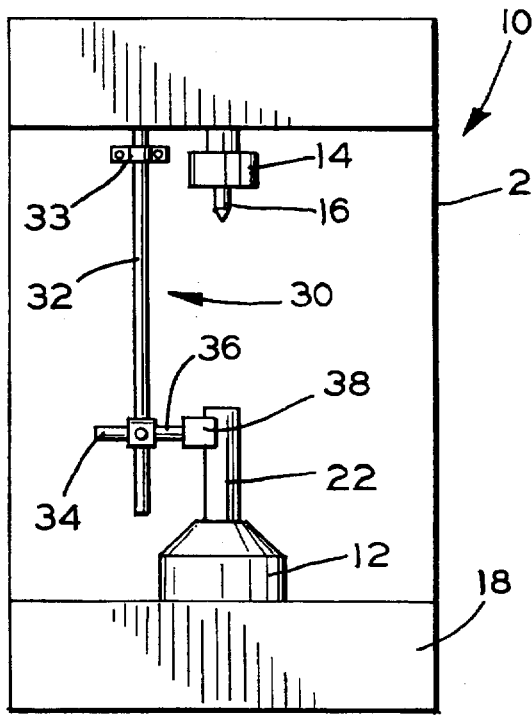
FIG. 3. is a view similar to FIG. 1, showing the headstock retracted, and the workpiece laterally supported by the support structure of the invention.
Figure 4:
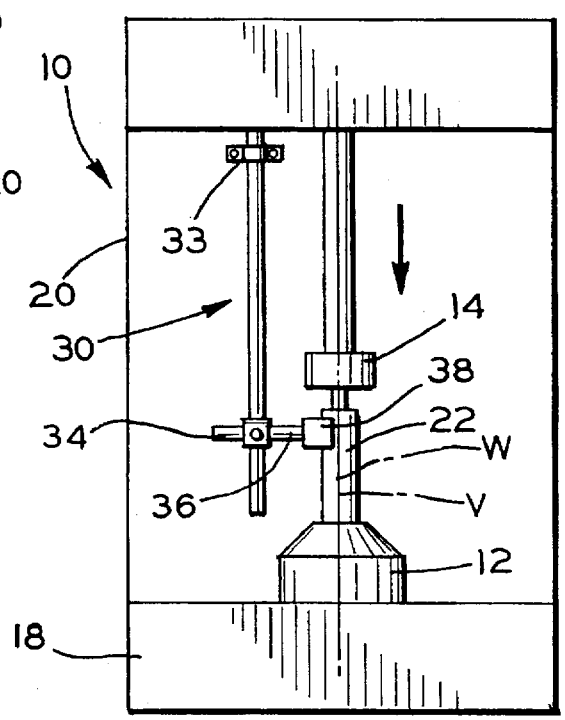
FIG. 4. is a view similar to FIGS. 2 and 3, showing the workpiece laterally supported by the support structure of the invention and the headstock engaging the upper end of the workpiece at the workpiece centerline, so that the workpiece centerline and the vertical support axis of the lathe are aligned.

Referring now to FIGS. 3 and 4, a support structure for laterally supporting the workpiece 22 in the lathe 10 is illustrated generally at 30. The support structure 30 helps to hold the workpiece axis W of the workpiece 22 aligned with the vertical lathe axis V. The support structure 30 includes a rod 32 which is vertically supported on the lathe 10 by a bracket 33. The vertical rod 32 supports a movable locator rest assembly 34. The locator rest assembly 34 includes a horizontally extending rod 36 which terminates in a part rest 38 which can be positioned so as to engage and support the workpiece 22 in a precisely vertical manner. With the workpiece 22 thus vertically supported by the support structure 30, when the headstock 14 engages the workpiece 22, the workpiece axis W will be properly aligned with the lathe axis V. The headstock 14 and the tailstock 12 hold the workpiece 22 in this vertically aligned position during rotation of the workpiece 22 by the headstock 14 and the machining of the workpiece 22 in the lathe 10.

Figure 5:
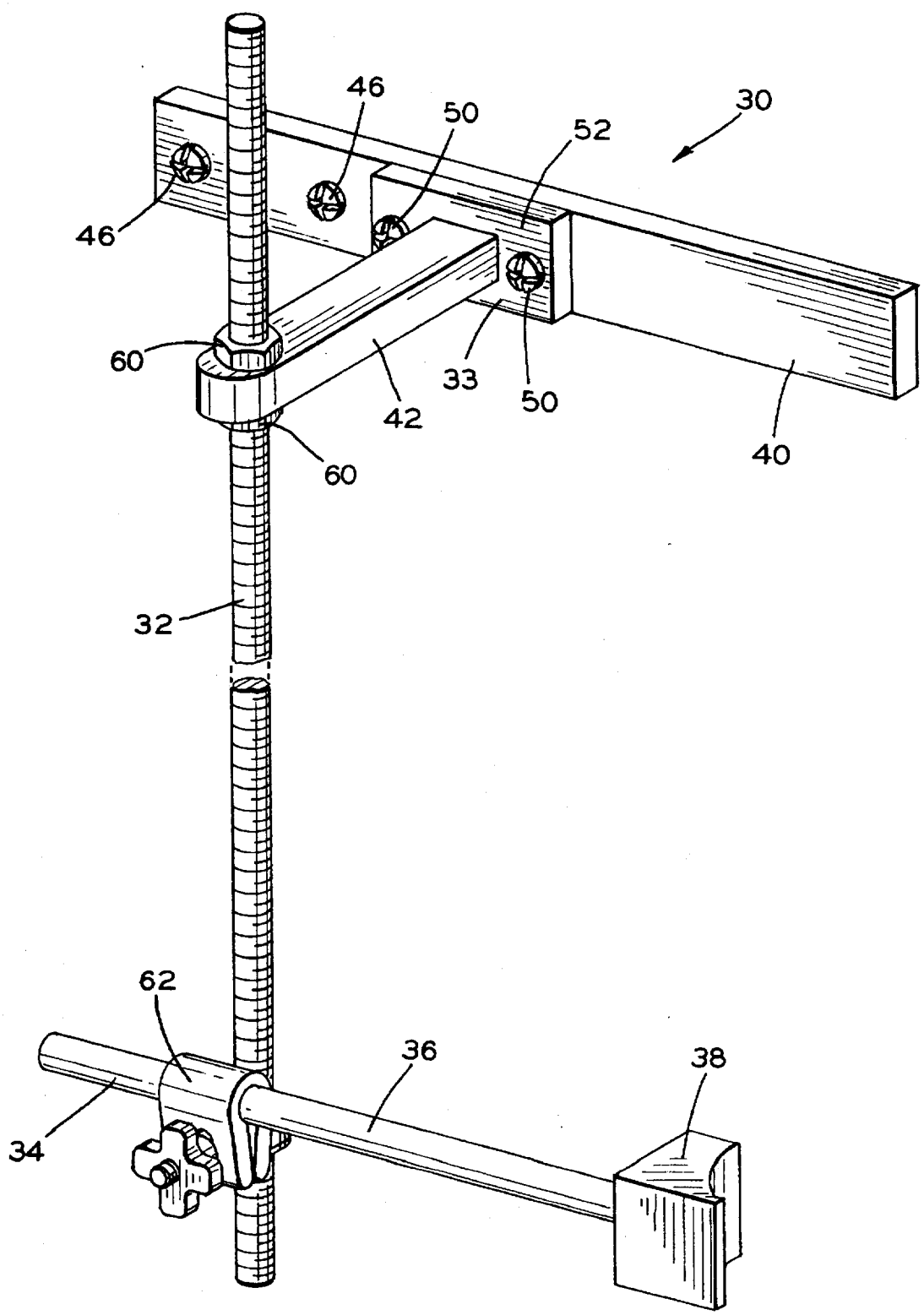
FIG. 5 is a perspective view of the support structure of the invention.
Figure 6:
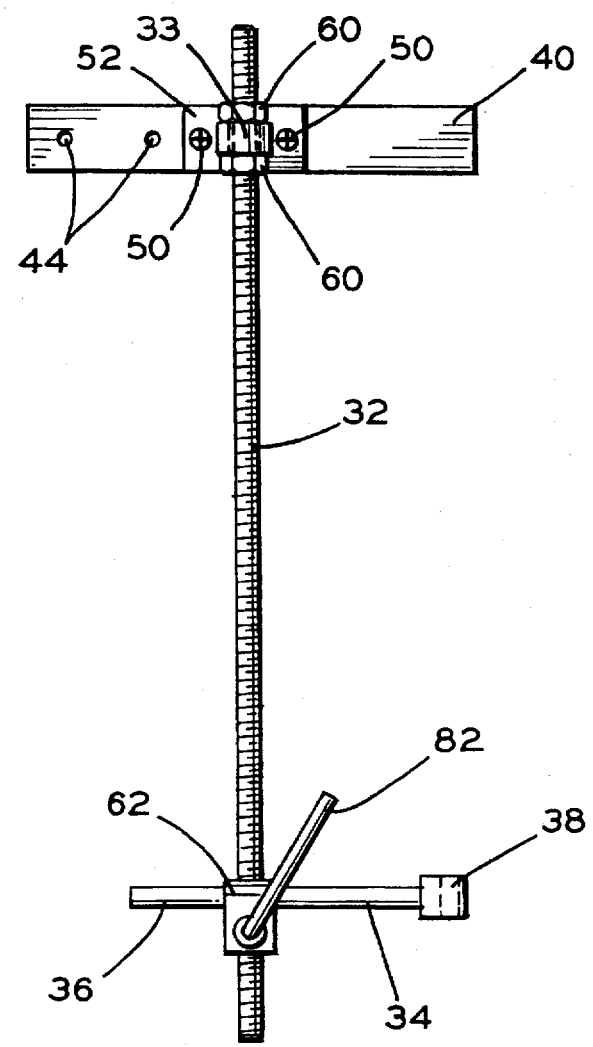
FIG. 6 is a front elevational view of the support structure shown in FIG. 5.
Figure 7:
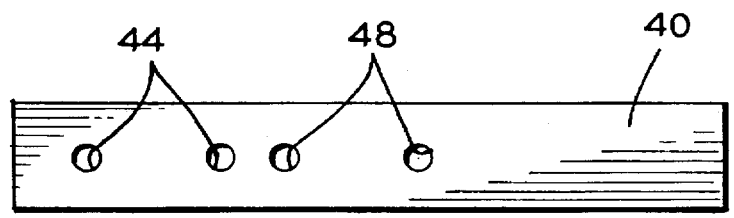
FIG. 7 is a front elevational view of a mounting plate of the support structure shown in FIG. 5.

Referring now to FIGS. 5 and 6, it may be seen that the bracket 33 includes a mounting plate 40 and a horizontally extending locator arm 42. The mounting plate 40 is illustrated in detail in FIG. 7. The mounting plate 40, in the illustrated embodiment, consists of a horizontally elongated rectangular plate. A first pair of holes 44 are formed through the mounting plate 40 which accept a respective pair of bolts 46, or other suitable fasteners, for fixing the mounting plate 40 to the frame 18 of the lathe 10. A second pair of holes 48 are formed through the plate 40. The second pair of holes 48 receive a respective pair of bolts 50, or other suitable fasteners, for fixing the locator arm 42 to the mounting plate 40. Preferably the holes 44 and 48 are threaded to engage the bolts 46 and 50, respectively, without the need for corresponding nuts. It should be noted that while the illustrated embodiment of the mounting plate 40 is a flat plate, any suitable shape may be used. For example, it may be necessary to bend the mounting plate 40 to provide clearance for wiring within the enclosure 20. It is also contemplated that the mounting plate 40 may be formed as an integral part of the frame 18, so that the locator arm 42 is fastened directly to the frame 18 of the lathe 10.

Figure 8:
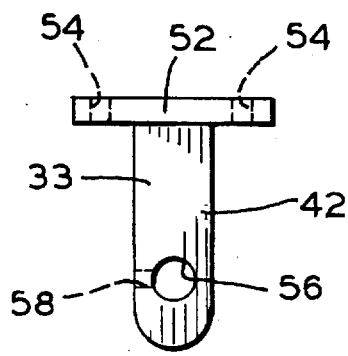
FIG. 8 is a top plan view of a locator bracket of the support structure shown in FIG. 5.

As best seen in FIGS. 5 and 8, the locator arm 42 of the bracket 33 has a radially extending rectangular flange 52 formed at a first end thereof. The flange 52 includes a pair of holes 54 formed therethrough. The bolts 50 extend through the holes 54 to engage respective ones of the threaded holes 48 in the mounting plate to fix the locator arm 42 to the mounting plate 40.

A vertically extending hole 56 is formed through the locator arm 42 near a second end of the locator arm 42. Preferably the hole 56 is threaded.

The vertical rod 32 extends vertically through the hole 56 in the locator arm 42. Preferably, the vertical rod 32 is threaded, and is screwed into the hole 56. By selectively rotating the threaded rod 32 in the threaded hole 56, the vertical rod 32 may be moved up and down relative to the locator arm 42, and thus positioned at a desired vertical position relative to the lathe 10. To fix the relative positions of the vertical rod 32 and the locator arm 42, a threaded set screw hole 58 is provided in the locator arm 42, as shown in FIG. 8. The set screw hole 58 extends from an outer surface of the locator arm 42 to the hole 56. A set screw (not shown) can be threaded into the set screw hole 58 and advanced into engagement with the vertical rod 32 in the hole 56. Additionally, or in place of the set screw, a pair of lock nuts 60 (FIG. 5) may be threaded onto the vertical rod 32, and tightened against the upper and lower surfaces of the locator arm 42 to prevent rotation of the vertical rod 32 in the hole 56 of the locator arm 42. Thus the vertical rod 32 may be moved up and down relative to the locator arm 42, and selectively locked in place relative to the locator arm 42.

Of course, any suitable embodiment of the bracket 33 may be used to support the vertical rod 32. For example, the vertical rod 32 may be smooth, instead of continuously threaded, and the locator arm 42 provided with a clamp mechanism (not shown) for maintaining the vertical rod 32 in a desired orientation and selectively clamping the vertical rod 32 to prevent relative motion between the vertical rod 32 and the locator arm 42. It should also be noted that while it is believed that maintaining the vertical rod 32 vertical (parallel to the lathe axis V) is preferable in order to facilitate quick setup of the support structure 30 to align the workpiece 22, it is contemplated that in some situations it may be desirable to orient the vertical rod 32 in a non-vertical orientation. A lathe with a non-vertical rod 32 and a bracket 33 for supporting the vertical rod 32 in this orientation are contemplated as an alternate embodiment of the invention.

Figure 9:
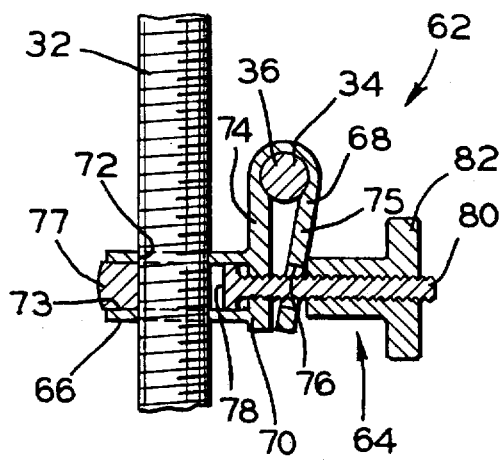
FIG. 9 is an elevational view, partly in section of a clamp of the support structure shown in FIG. 5.

A clamp assembly 62 is selectively fixed to the vertical rod 32 below the bracket 33. The clamp assembly 62 supports the locator rest assembly 34 relative to the vertical rod 32. As shown in FIG. 9, the clamp assembly 62 is preferably a compound clamp which may be selectively clamped to the vertical rod 32 and to the horizontal rod 36 of the locator rest assembly 34. The illustrated embodiment of the clamp assembly 62 is a compound clamp which uses a single screw mechanism 64 to simultaneously selectively actuate a first clamp 66 to fix the clamp assembly 62 to the vertical rod 32 and a second clamp 68 to fix the clamp assembly 62 to the horizontal rod 36. The clamp assembly 62 includes a housing 70 defining a vertical bore 72 through which the vertical rod 32 extends. The housing 70 further defines a horizontal bore 73 which intersects the vertical bore 72.

The second clamp 68 is formed integrally with the housing 79, and includes an upwardly extending flange 74 and a flap 75 fixed to the flange 74 along an upper marginal edge thereof. The flap 75 has an opening 76 therethrough which is axially aligned with the horizontal bore 73. The horizontal rod 36 of the locator rest assembly 34 is clamped in the clamp 68 between the flap 75 and the flange 74.

A clamp member 77 is movable within the horizontal bore 73. The clamp member 77 defines an elongated vertical opening 78 therethrough, through which the vertical rod 32 extends. A threaded rod 80 extends from the clamp member 77 to extend out of the horizontal bore 73 and through the opening 76 in the flap 75. The threaded rod 80 form a part of the screw mechanism 64. A handle 82, which forms a second part of the screw mechanism 64 is threaded onto the end of the threaded rod 80 extending out of the horizontal bore 73. The handle 82 may have any suitable shape such as the cruciform shape illustrated in FIG. 5, or the elongated single lever illustrated in FIG. 6

When the vertical opening 78 in the clamp member 77 is coaxial with the vertical bore 72, the clamp assembly 62 is free to move upwardly and downwardly on the vertical rod 32. As viewed in FIG. 9, the screw mechanism 64 can be operated to actuate the clamp assembly 62. Screwing the handle 82 onto the threaded rod 80 so that the handle 82 bears against the housing 70 causes the screw mechanism 64 to draw the clamp member 77 rightwardly. The clamp member 77 is thereby draun rightwardly to clamp the vertical rod 32 in the clamp 66 between the left side of the vertical opening 78 and the right side of the vertical bore 72. Simultaneously, the flap 75 is driven by the handle toward the flange 74, tightening the clamp 68 about the horizontal rod 36. The handle 82 is rotated in the opposite direction to release the clamps 66 and 68.

While the clamp assembly 62 has been described and shown as a compound clamp assembly in which the single screw mechanism 64 actuates both the clamps 66 and 68, it should be recognized that the clamps 66 and 68 may be constructed such that they are each actuated by separate screw mechanisms (not shown). Indeed, one or both of the clamps 66 and 68 may be replaced by other mechanisms for releasably fixing the relative positions of the clamp assembly 62, the vertical rod 32 and the horizontal rod 36. For example, the clamp 66 could be replaced by a threaded bore through the housing 70, which allows the housing 70 to be screwed up and down the vertical rod 32 to a desired height. Suitably, lock nuts similar to the lock nuts 60 may be tightened against the upper and lower surfaces of the clamp assembly 62 to prevent rotation and vertical movement of the clamp assembly on the vertical rod 32.

Figure 10:
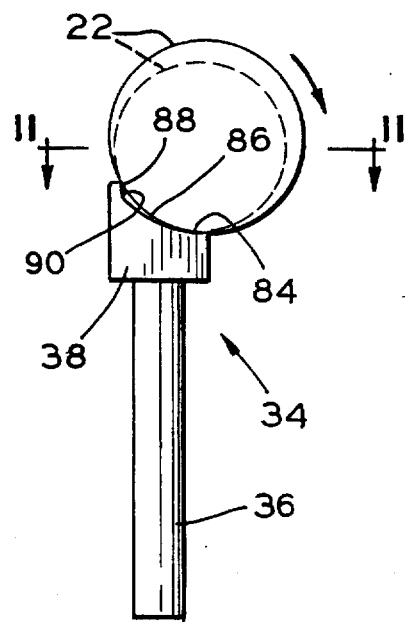
FIG. 10 is top plan view of a locator rest of the support structure shown in FIG. 5.
Figure 11:
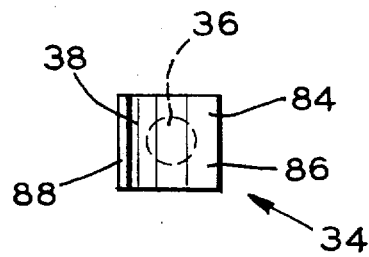
FIG. 11 is a view of the locator bracket illustrated in FIG. 10 taken along the line 11—11 of FIG. 10.

As seen in FIGS. 10 and 11, the locator rest assembly 34 includes the horizontally extending rod 36 and the part rest 38. The horizontal rod 36 and the part rest 38 may be integrally formed or may be formed as separate pieces which are joined by any suitable method after forming to make up the locator rest assembly 34.

The part rest 38 is a generally cubical member, with a generally concave, vertically extending support face 84 formed thereon. The support face 84 includes an arcuate wall portion 86 and a flat wall portion 88. Note that the flat wall portion 88 is not tangent to the arcuate wall portion 86. Rather the support face 84 is bifurcated by a corner 90 formed by the flat wall portion 88 and the arcuate wall portion 86.

As illustrated in FIG. 10, the support face 84 of the part rest 38 engages the workpiece 22 to help support the workpiece 22 vertically in the lathe 10. Preferably, the support structure 30 is arranged such that the locator rest assembly engages an upper portion of the workpiece 22 (as shown in FIGS. 3 and 4), and so that the workpiece 22 contacts the support face 84 on both the arcuate wall portion 86 and the flat wall portion 88 thereof. The bifurcated support face 84 thus provides support for the workpiece 22 at two spaced apart locations, which increases the stability of the support provided by the support structure 30 to the workpiece 22.

The part rest 38 is preferably positioned so the point of first contact of the workpiece 22 with the part rest 38 as the workpiece 22 rotates will be the curved wall portion 86 of the support face 84. Thus in FIG. 10, the part rest 38 is positioned for clockwise rotation of the workpiece 22.

Note that the support face 84 of the part rest 38 can provide support to workpieces 22 of various diameters, as depicted in FIG. 10 by the illustrated in solid and phantom lines. Therefore there is no need to provide different part rests 38 when machining workpieces of different diameters.

Note also that if the outer surface of the workpiece 22 is not vertical in the region contacted by the part rest 38, the clamp assembly 62 can be adjusted to allow the locator rest assembly 34 to rotate about the longitudinal axis of the horizontal rod 36, and to rotate about the longitudinal axis of the vertical rod 32 as needed to align the support face 84 to provide the best support for the workpiece 22. The clamp assembly 62 can then be tightened to secure the locator rest assembly 34 in this orientation.

Figure 12:
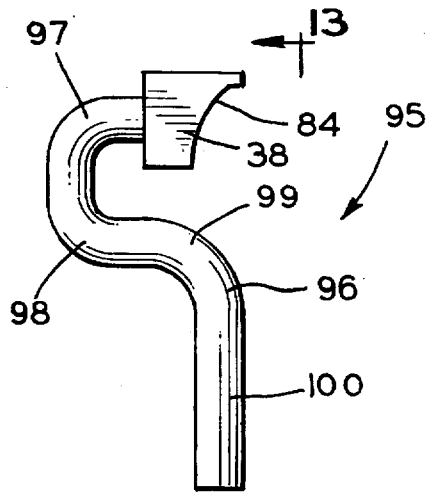
FIG. 12 is a view similar to FIG. 10 showing an alternate embodiment of a locator rest of the invention.
Figure 13:
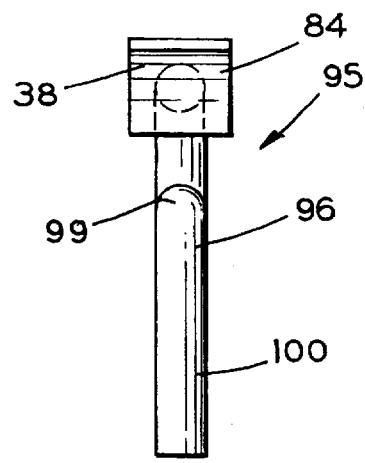
FIG. 13 is a view of the locator bracket illustrated in FIG. 12 taken along the line 13—13 of FIG. 12.

FIGS. 12 and 13 illustrate an alternate embodiment of a locator rest assembly, indicated generally at 95. The locator rest assembly 95 is generally similar to the locator rest assembly 34 described above, and includes an identical part rest 38. However the locator rest assembly 95 has a generally S-shaped rod 96 extending therefrom, instead of the straight rod 36 in the locator rest assembly 34. More specifically, as may be seen by reference to FIG. 12, as the rod 96 extends outwardly from the part rest 38, the rod 96 has two spaced apart left ninety degree turns, 97 and 98, followed by a right ninety degree turn 99, and ends in a straight section 100. The straight section 100 is generally aligned with the support face 84 of the part rest 38. The straight section 100 is the portion of the rod 96 which is engaged by the clamp assembly 62.

With respect to the respective sections of the locator rest assemblies 95 and 34 engaged by the clamp assembly 62, the part rest 38 of the locator rest assembly 95 illustrated in FIG. 12 is turned ninety degrees compared to the part rest 38 of the locator rest assembly 34 illustrated in FIG. 10. Thus a different portion of the workpiece 22 within the lathe 10 can be supported by the locator rest assembly 95 than the locator rest assembly 34. The different locator rest assemblies 34 and 95 may be desired, for example, for different layouts of the cutting tool of the lathe 10 and of the operator access into the enclosure 20, relative to the location of the support structure 30.

In operation, the vertical rod 32 is adjusted to a height which will accommodate expected variations in the height of the clamp assembly 62 without having to adjust the position of the vertical rod 32. The lock nuts 60 are then tightened against the locator arm 42 of the bracket 33 to fix the vertical rod 32 in this position. The clamp assembly 62 is loosened to move the clamp assembly 62 on the vertical rod 32 to a height where the locator assembly 34 will engage a suitable upper portion of the workpiece 22 when mounted on the tailstock 12. Note that a representative workpiece 22 may be installed in the proper orientation on the lathe 10 to assist in the setup of the support structure 30. While the clamp assembly 62 is loosened, the horizontal rod 34 is moved so that the support face 84 of the part rest 38 is properly positioned to support the workpiece 22 vertically, as described above. The clamp assembly 62 is then tightened.

To machine a workpiece 22 after setup of the support structure 30 as described in the preceding paragraph, the operator places the workpiece 22 onto the tailstock 12 with the lower center 24 of the workpiece 22 placed over the conical contact portion of the tailstock 12. By placing the workpiece 22 against the curved wall portion 86 and against the flat wall portion 88 of the part rest 38, the operator knows that the workpiece axis W of the workpiece 22 is properly aligned with the lathe axis V of the lathe 10.

The operator then closes the enclosure 20, and starts the lathe 10. The headstock 14 comes downwardly so that the conical contact portion 16 of the headstock 14 engages the upper center 26 of the workpiece 22, and clamps the workpiece 22 in position between the headstock 14 and the tailstock 12. Between the time the operator releases the workpiece 22 and the time the workpiece 22 is clamped between the tailstock 12 and the headstock 14, the support structure laterally supports the workpiece 22 with the workpiece axis W aligned with the lathe axis V. After the workpiece 22 is clamped between the tailstock 12 and the headstock 14, the lathe 10 begins to rotate the workpiece 22, and the cutting tool moves to machine away material from the workpiece 22 according to pre-programmed instructions. Note that the support structure 30 remains in contact with the workpiece 22 as the workpiece 22 rotates until the cutting tool of the lathe 10 machines away the outer surface of the workpiece 22 in the region of contact with the part rest 38. If any bumps (irregularities) are present in the outer surface of the workpiece 22, the vertical rod 32 will act as a spring to permit movement of the locator rest assembly 34 away from the workpiece 22 to skip over such bumps without damage to the locator rest assembly 34.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A support structure for laterally supporting a workpiece in a vertical lathe, comprising:

a mounting plate adapted to be fixed to the vertical lathe;

a locator arm extending from said mounting plate and having a threaded bore formed therethrough;

a threaded rod extending through and cooperating with said threaded bore formed in said locator arm such that rotation of said threaded rod causes movement of said threaded rod relative to said locator arm; and a clamp including a first clamp releasable engaged with said threaded rod, a second clamp connected to said first clamp and releasably engaged with a locator rod, and a part rest fixed to said locator rod and adapted to engage a workpiece mounted in the vertical lathe, said part rest having a bifurcated support face.

2. A support structure defined in claim 1 further including a structure for preventing rotation of said threaded rod relative to said locator arm.

3. The support structure defined in claim 2 wherein said structure for preventing rotation includes a lock nut threaded onto said threaded rod and adapted to engage said locator arm to prevent rotation of said threaded rod relative to said locator arm.

4. The support structure defined in claim 2 wherein said structure for preventing rotation includes a pair of lock nuts threaded onto said threaded rod and adapted to engage said locator arm to prevent rotation of said threaded rod relative to said locator arm.

5. The support structure defined in claim 1 wherein said fast clamp includes a housing defining a first bore through which said threaded rod extends and a screw mechanism for selectively engaging said threaded rod.

6. The support structure defined in claim 1 wherein said second clamp includes a flange, a flap fixed to said flange, and a screw mechanism for selectively causing said flange and said flap to engage said locator rod.

7. The support structure defined in claim 1 wherein said clamp assembly includes a compound clamp that includes both said first clamp and said second clamp.

8. The support structure defined in claim 7 wherein said compound clamp includes a housing defining a first bore through which said threaded rod extends, a flange, a flap fixed to said flange, and a screw mechanism for selectively engaging said threaded rod and for selectively causing said flange and said flap to engage said locator rod.

9. The support structure defined in claim 1 wherein said locator rod is linear.

10. The support structure defined in claim 1 wherein said locator rod is generally S-shaped.

11. The support structure defined in claim 1 wherein said part rest is a generally cubical member having a generally concave support face formed thereon.

* * * * *

UNITED STATES PATENT AND TRADEMARK OFFICE
CERTIFICATE OF CORRECTION

PATENT NO. : 5,711,198
DATED : January 27, 1998
INVENTOR(S) : Rhonda M. Rice, et al.

It is certified that error appears in the above-indentified patent and that said Letters Patent is hereby corrected as shown below:

Column 9, Claim 1, Line 3, after "a clamp", insert - - "assembly"

Column 9, Claim 1, Line 3, after "a clamp assembly including a first clamp", delete "releasable" and insert --releasably--

Column 9, Claim 2, Line 9, delete "A", insert -- "The"

Column 9, Claim 5, Line 22, after "The support structure defined in claim 1 wherein said", delete -- "fast", insert -- "first"

Signed and Sealed this

Fifth Day of May, 1998

Attest:

BRUCE LEHMAN

*Attesting Officer*          *Commissioner of Patents and Trademarks*